United States Patent [19]

Mossner et al.

[11] 4,082,472
[45] Apr. 4, 1978

[54] FLOATING TOOL HOLDER

[75] Inventors: William Arno Mossner, Frankenmuth; Gerald Edwin Mueller, Saginaw, both of Mich.

[73] Assignee: Houdaille Industries, Inc., Buffalo, N.Y.

[21] Appl. No.: 636,546

[22] Filed: Dec. 1, 1975

[51] Int. Cl.² .................................................. B23B 51/06
[52] U.S. Cl. ......................................... 408/57; 279/16; 279/20; 408/59; 408/127
[58] Field of Search ............... 279/16, 20, 47; 408/57, 408/127, 59

[56] References Cited

U.S. PATENT DOCUMENTS

| | | | |
|---|---|---|---|
| 1,359,103 | 11/1920 | Randa | 279/16 |
| 2,820,378 | 1/1958 | Randles et al. | 408/127 |
| 3,454,283 | 7/1969 | Benjamin et al. | 279/16 |
| 3,595,591 | 7/1971 | Koch et al. | 279/16 |

*Primary Examiner*—Z. R. Bilinsky

*Attorney, Agent, or Firm*—Hill, Gross, Simpson, Van Santen, Steadman, Chiara & Simpson

[57] ABSTRACT

A Floating Tool Holder includes a shank having an annular sleeve secured to one end thereof, there being a tool chuck assembly retained between the end of the shank and a flange on the sleeve, driver means for transmitting rotary motion from the shank to the tool chuck assembly, there being a pair of annular bearings which engage the tool chuck assembly and enable slight relative radial movement, the bearings having flat surfaces which constitute a thermal diffusion of a metal boride, such as di-iron boride. There is a seal between the tool chuck assembly and the sleeve, and centering means acting between the shank and the tool chuck assembly and constructed to enable the conducting of a coolant through the shank into the tool chuck assembly, certain components being further constructed to enable length of the device to be minimized. The tool chuck assembly has a deep hole receptive of a substantial portion of a tool.

12 Claims, 4 Drawing Figures

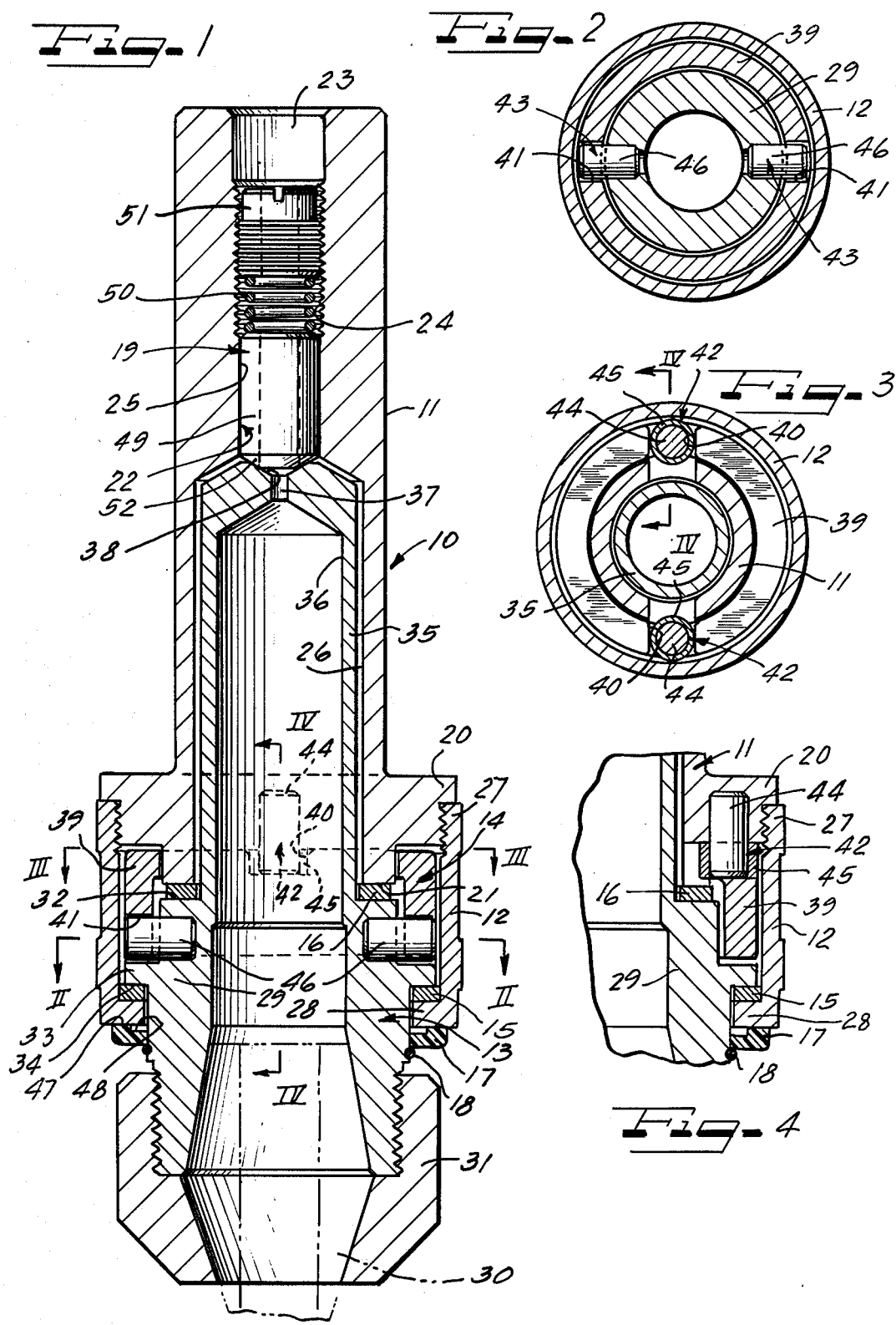

FLOATING TOOL HOLDER

BACKGROUND OF THE INVENTION

1. Field of the Invention

This invention relates to a floating tool holder.

2. Prior Art

U.S. Pat. No. 3,595,591 discloses two floating tool holders, one of which has a deep-hole capacity and the other of which has centering means. The deep-hole capacity enables a substantial portion of the tool to be inserted in the tool holder to minimize the amount that the tool projects therefrom. The centering feature restores or tends to maintain a tool chuck assembly concentric with the axis of rotation. Although these prior devices are advantageous, they have certain disadvantages. One of the main disadvantages is that these prior devices employ balls to carry substantial thrust loads. Such axial loads create brinelling at the balls, thus impairing the ability of the tool chuck assembly to float in a radial direction. Another difficulty with these prior art devices is that they employ a seal between the tool chuck assembly and a radially adjacent flange. Such seal is resilient and must yield whenever there is any floating movement of the tool chuck assembly. Although this constitutes a tendency to provide self-centering, it could be expected that the centering force is too great or too little, thus impairing the quality of workmanship that can be performed. Similarly, the self-centering means of this prior patent also may provide a centering force that is too great or too little. With a heavy tool being driven, a somewhat greater centering force is needed than if a lightweight tool were used. Further, these prior constructions have a greater axial length than is desired. Various solutions have been proposed by others for one or more of these problems, particularly the brinelling problem, and those prior devices have been difficult in that they are susceptible to breakage under heavy torque and are costly to produce. Some of these problems are at their worst when the tool holder is used with an end reamer. Thus the main problem is to maintain the reliability of floating action even though the tool holder is used with a substantial end thrust during cutting.

SUMMARY OF THE INVENTION

The floating tool holder of the invention employs flat annular bearings that carry the thrust loads on surfaces which constitute a thermal diffusion of a metal boride such as di-iron boride. Further, both the deep-hole capacity and self-centering features are combined in one device, the device having a driver portion constructed to enable shortening of the tool holder. The force provided by the centering means is adjustable to compensate for the requirements of a particular operation and this adjustable means and the other components are constructed to enable feed-through of coolant to the tool. A seal is provided which acts axially and thus is devoid of any radial force that would otherwise affect the floating action.

Accordingly, it is an object of the present invention to provide a floating tool holder capable of withstanding substantial end thrust while avoiding brinelling, breakage, and improper floating action.

Another object of the present invention is to provide a floating tool holder that has a seal which does not affect the floating action.

A still further object of the present invention is to provide a floating tool holder which can be constructed in shorter embodiments.

A still further object of the present invention is to provide a floating tool holder that has a deep-hole capacity coupled with centering means for maintaining normal coaxial alignment of the tool with the rotational axis.

A still further object is to provide a tool holder having centering means coupled with a capability of feeding a coolant through the tool holder without impairing the centering function.

A still further object of the present invention is to provide a tool holder that has a deep-hole capacity coupled with the ability to feed a coolant axially through the tool holder.

Other objects, features, and additional advantages of the present invention will become apparent to those skilled in the art from the drawing and the detailed description relating thereto.

BRIEF DESCRIPTION OF THE DRAWING

FIG. 1 is a longitudinal cross-sectional view of a tool holder embodying the present invention:

FIG. 2 is a cross-sectional view in reduced scale taken along line II—II of FIG. 1:

FIG. 3 is a cross-sectional view in reduced scale taken along line III—III of FIG. 1: and FIG. 4 is a fragmentary cross-sectional view taken along line IV—IV of FIG. 1 and of FIG. 3.

AS SHOWN ON THE DRAWINGS

The principles of this invention are particularly useful when embodied in a floating tool holder such as that illustrated in FIG. 1, generally indicated by the numeral 10. The tool holder 10 generally includes a shank 11, an annular sleeve 12, a tool chuck assembly 13, driver means 14, a first annular bearing 15, a second annular bearing 16, an annular sealing ring 17, a retainer 18, and centering means 19.

The shank 11 has a radially outwardly directed flange 20 disposed adjacent to one end 21, has a portion 23 adapted to be fluidly coupled to a source of coolant, a threaded portion 24 and a guide portion 25 for the centering means 19, and an enlarged bore portion 26 for providing radial clearance for the tool chuck assembly 13.

The annular sleeve 12 is secured at one end 27 by threads received on corresponding threads on the shank flange 20, and the sleeve 12 projects axially beyond the end 21 of the shank 11 and terminates in an inwardly directed flange 28.

The tool chuck assembly 13 includes a body 29, a radially compressible collet 30 receptive of a tool, and a nut 31. The collet 30 and the nut 31 are conventional. The body 29 has an axially directed surface 32 which is adjacent to the end 21 of the shank 11. The body 29 has an outwardly directed flange 33 disposed within the sleeve 12 and having an axially directed flange 34 adjacent to and facing the sleeve flange 28. The body 29 has an integral tubular portion 35 which is receptive of tooling. More specifically, a cutting tool may be inserted into the tool holder so that the shank of the tool is held by the adapter 30 with no problem of the tool extending into the tubular portion 35. Such would be conventional. However, the tubular portion provides a deep-hole 36 which enables the tool to be inserted much further into the tool holder so that the collet 30 grasps the tool closer to its cutting end, thus shortening the amount of tool length projecting from the nut 31. The tubular portion 35 has an end with an aperture 37 therein for admitting coolant to be fed to the tool. The end of the tubular portion 35 has an external generally concave surface 38 which functions as a camming surface and as a sealing surface.

The shank 11 of the tool holder 10 is held in the spindle of a machine tool and is rotated about an axis, and the driver means 14 applies rotational force to the tool chuck assembly 13. The driver means 14 is disposed within the sleeve 12 and not only drives te tool chuck assembly 13 about the rotational axis, but it also enables the tool chuck assembly 13 to shift radially for a limited amount, such movement being referred to herein as "floating". The driver means 14 includes an annular driver 39 which has a radial clearance with respect to the body 29. The driver 39 has a first pair of slots 40, 40 at the end thereof adjacent to the shank flange 20, and a second pair of slots 41, 41 at the other end. The driver means 14 includes a first pair of driving means 42, 42 and a second pair of driving means 43, 43. The first pair of driving means 42, 42 comprises a pair of pins 44, 44, each of which is fixed to the shank 11 at the flange 20, each extending parallel to the length of the shank into the slots 40, 40. Each pin 44 has a roller 45 whose axial length is less than its diameter, the diameter spanning the slot 40, whereby the rotation of the shank 11 is imparted to the driver means 14. Each of the second pair of driving means 43, 43 comprises a pin 46 affixed to the body 29 and extending into one of the slots 41, 41 and thus engaging the annular driver 39 directly.

The first annular bearing 15 has flat surfaces which engage the inner side of the flange 28 of the sleeve 12 and the adjacent side of flange 33 of the body 29.

The second annular bearing 16 has flat surfaces which engage the end 21 of the shank 11 and the axially directed annular surface 32 on the body 29.

The annular sealing ring 17 is carried on the body 29 and has a close fit therewith and has an axially directed annular surface 47 which engages the axially directed end surface of the sleeve 12 at the flange 28. To maintain this engagement with a degree of force, the sealing ring 17 is centrally recessed within the annular surface 47, at 48, and the retainer 18, carried in a groove on the body 29, acts on the central part of the sealing ring 17 to urge it toward the sleeve 12, thus maintaining the seal.

The centering means 19 includes a tubular member 49, a spring 50 and a threaded tubular plug.51. The tubular member 49 is slidably guided in the guide bore 25 and the plug 51 is carried in the threads 24 of the bore 22. One end 52 of the tubular member 49 is formed as a cam surface for coacting with the cam surface 38 to affect centering of the tool chuck assembly 13. The cam surfaces 38, 52 also function as a seal when there is no floating action.

An important aspect of the present invention is that the flat annular bearing surfaces on the bearings 15, 16 have been subjected to a treatment by which there is a thermal diffusion of a metal boride formed thereon, a typical or preferred surface being di-iron boride. This surface is a case or coating that is formed on a hardened metal base. It is extremely hard having almost the hardness of carbide, and has a low coefficient of friction or relatively high lubricity. A carbide coating is not equivalent because its coefficient of friction if too high. Tetrafluoroethylene is not equivalent because it is too soft. This case or coating is known per se in the trade. One commercial source for such a coating is Atlantic Advanced Metals, Inc. which uses the designation "Borkote" as an identification. Another commercial source for having the coating applied is Kennametal, Inc., One Lloyd Avenue, Latrobe, Pennsylvania 15650 which refers to the process as "Kennadize Series KA-100 Process". Another commercial source for this treatment is Materials Development Corporation, 81 Hicks Avenue, Medford, Massachusett 02155 that identifies the process as "Borofuse". Although the present invention utilizes bearings that have been subjected to boride formation, the process itself does not need to be known to describe the invention. It is known that a cutting tool, such as might be held by the present tool holder, will last longer in many applications if such cutting tool has been provided with a borided cutting surface. It is also known that a boride treatment will reduce corosion resistance, which has not been a problem with the present subject matter. In the February, 1971 issue of "METAL PROGRESS", beginning at page 101, there is an article on boriding.

The setting of the centering means 19 needs to be determined empirically for each application. If there is too much centering force, there would be a tendency to resist floating and the cutter would not easily and smoothly follow the axis of a previously formed hole, such as for reaming that hole, but would tend to make the hole out of round where the hole and the rotational axis do not coincide precisely. If the setting is too weak, centering would be doubtful. The mass of the cutting tool, the thickness of the workpiece, and other factors external to the tool holder affect the proper setting for a particular application. It has been found that no rollers are needed on the pins 46, and positioning the pins 44 to be parallel with the rotational axis further assists in shortening the overall length of the tool holder.

The frictional forces at the surface 47 of the seal 17 are minimal and thus have no significant effect on the floating action.

While the shank 11 is most often held by a rotatable spindle, it can also be held in a stationary manner, such as in a tailstock with the workpiece revolving.

Although various minor modifications might be suggested by those versed in the art, it should be understood that we wish to embody within the scope of the patent warranted thereon, all such embodiments as reasonably and properly come within the scope of our contribution to the art.

We claim as our invention:

1. A floating tool holder comprising:
   (a) a supporting shank having an outwardly directed flange near one end thereof, said shank having a bore extending axially therethrough;
   (b) an annular sleeve secured at one end to said flange and projecting in spaced relation to said shank beyond said one end thereof, and having an inwardly directed flange at its other end;
   (c) a tool chuck assembly having a body aligned with said shank, said body having a tubular portion integral therewith and receptive of tooling and extending into said axial bore of said shank where the shank is adapted to be supported, there being a radial clearance between said tubular portion and said axial bore in said shank, and said tubular portion having an end aperture in said shank bore for conducting coolant from said axial bore into said body, an axially directed surface of said chuck body being adjacent to said one end of said shank, said chuck body having an outwardly directed flange within said annular sleeve adjacent to said sleeve flange for retaining said chuck body;

(d) driver means within said annular sleeve for corotatably connecting said shank to said chuck body and for enabling radial displacement therebetween; and (e) a first annular bearing disposed between and having flat surfaces slidably engaging said flanges on said sleeve and said chuck body, and a second annular bearing disposed between and having flat surfaces slidably engaging said one end of said shank and said axially directed chuck body surface, said flat surfaces of said bearings being a thermal-diffusion of a metal boride.

2. A floating tool holder according to claim 1 including an annular sealing ring carried on and closely surrounding said body, and having an axially directed sealing surface slidably engaging an axially directed face on said other end of said sleeve.

3. A floating tool holder according to claim 2 in which said sealing ring has an annular recess radially within said axially directed surface, and a retainer on said body urging the radially innermost portion of said sealing ring toward said sleeve.

4. A floating tool holder according to claim 1 in which said driver means comprises:

(a) an annular driver within said sleeve and loosely surrounding said body, the driver having at one axial end a first pair of slots and at the other end a second pair of slots;

(b) a first pair of driving means fixed to said flange of said shank and projecting in a direction parallel to the length of said shank into said first pair of slots; and (c) a second pair of driving means fixed to said chuck body and projecting into said second pair of slots.

5. A floating tool holder according to claim 4 in which said second pair of driving means comprises a pair of pins whose distal ends directly freely engage said annular driver in said second pair of slots.

6. A floating tool holder according to claim 1 including apertured means carried by said shank in said bore and acting on the end of the tubular portion for centering said tool chuck assembly.

7. A floating tool holder comprising:

(a) a shank having an axial bore and an outwardly directed flange near one end thereof;

(b) an annular sleeve secured at one end to said flange and projecting in spaced relation to said shank beyond said one end thereof, and having an inwardly directed flange at its other end;

(c) a tool chuck assembly having a body aligned with said shank, said body having a tubular portion integral therewith receptive of tooling, there being a radial clearance between an enlarged portion of said bore and said tubular portion, an axially directed surface of said chuck body being adjacent to said one end of said shank, said chuck body having an outwardly directed flange within said annular sleeve adjacent to said sleeve flange for retaining said chuck body;

(d) means carried by said shank in said bore and acting on the end of said tubular portion for centering said tool chuck assembly, said centering means including a spring-loaded tubular member slidably guided in said bore for conducting coolant to an end aperture in said body, there being cam surfaces on the abutting ends of said tubular member and said body by which said centering is effected;

(e) driver means within said annular sleeve for corotatably connecting said shank to said chuck body and for enabling radial displacement therebetween; and (f) a first annular bearing disposed between and having flat surfaces slidably engaging siad flanges on said sleeve and said chuck body, and a second annular bearing disposed between and having flat surfaces slidably engaging said one end of said shank and said axially directed chuck body surface, said flat surfaces of said bearings being a thermal-diffusion of metal boride.

8. A floating tool holder according to claim 7 in which said driver means comprises:

(a) an annular driver within said sleeve and loosely surrounding said body, the driver having at one axial end a first pair of slots and at the other end a second pair of slots;

(b) a first pair of driving means fixed to said flange of said shank and projecting in a direction parallel to the length of said shank into said first pair of slots; and (c) a second pair of driving means fixed to said chuck body and projecting into said second pair of slots.

9. A floating tool holder according to claim 8 in which said second pair of driving means comprises a pair of pins whose distal ends directly freely engage said annular driver in said second pair of slots.

10. A floating tool holder according to claim 8 in which said first pair of driving means comprises a pair of pins each having a roller on the distal end thereof, each roller having an extent in the direction parallel to the length of said shank shorter than its diameter and disposed in said first pair of slots.

11. A floating tool holder according to claim 7 including an annular sealing ring carried on and closely surrounding said body, and having an axially directed surface slidably engaging said other end of said sleeve.

12. A floating tool holder according to claim 7 in which said driver means comprises:

(a) an annular driver within said sleeve and loosely surrounding said body, the driver having at one axial end a first pair of slots and at the other end a second pair of slots;

(b) a first pair of driving means fixed to said flange of said shank and projecting in a direction parallel to the length of said shank into said first pair of slots; and (c) a second pair of driving means fixed to said chuck body and projecting into said second pair of slots.

* * * * *

UNITED STATES PATENT AND TRADEMARK OFFICE
CERTIFICATE OF CORRECTION

PATENT NO. : 4,082,472
DATED : April 4, 1978
INVENTOR(S) : William A. Mossner and Gerald E. Mueller It is certified that error appears in the above-identified patent and that said Letters Patent are hereby corrected as shown below:

Column 1, line 39, change "difficult" to --deficient--.

Column 2, line 59, change "flange" to --surface--.

Column 2, line 64, change "problem" to --portion--.

Column 3, line 12, change "te" to --the--.

Column 4, line 46, change "thereon" to --hereon--.

Column 6, line 16, change "siad" to --said--.

Column 6, line 17, change "second body" to --second--.

Signed and Sealed this

Thirty-first Day of October 1978

[SEAL]

Attest:

RUTH C. MASON
Attesting Officer

DONALD W. BANNER
Commissioner of Patents and Trademarks